United States Patent
Jang

(10) Patent No.: US 11,110,919 B2
(45) Date of Patent: Sep. 7, 2021

(54) CRUISE CONTROL SYSTEM AND CRUISE CONTROL METHOD FOR MILD HYBRID ELECTRIC VEHICLE

(71) Applicants: Hyundai Motor Company, Seoul (KR); Kia Motors Corporation, Seoul (KR)

(72) Inventor: Hwa Yong Jang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 69 days.

(21) Appl. No.: 16/059,288

(22) Filed: Aug. 9, 2018

(65) Prior Publication Data

US 2019/0184991 A1    Jun. 20, 2019

(30) Foreign Application Priority Data

Dec. 18, 2017    (KR) .................... 10-2017-0174548

(51) Int. Cl.
*B60W 30/14*    (2006.01)
*B60W 20/14*    (2016.01)

(52) U.S. Cl.
CPC .......... *B60W 30/143* (2013.01); *B60W 20/14* (2016.01); *B60W 2510/244* (2013.01); *B60W 2520/105* (2013.01)

(58) Field of Classification Search
CPC ......... B60W 30/143; B60W 2510/244; B60W 2510/105
See application file for complete search history.

(56) References Cited

U.S. PATENT DOCUMENTS

| | | | | |
|---|---|---|---|---|
| 6,570,265 | B1* | 5/2003 | Shiraishi | B60W 10/08 290/40 C |
| 9,340,197 | B1* | 5/2016 | Miersch-Wiemers | B60L 15/20 |
| 2002/0024306 | A1* | 2/2002 | Imai | B60K 6/36 318/34 |
| 2015/0375747 | A1* | 12/2015 | Shishido | B60W 10/18 701/48 |
| 2016/0114792 | A1* | 4/2016 | Gibson | B60L 50/16 701/22 |
| 2017/0219657 | A1* | 8/2017 | Vovos | G01R 31/3648 |
| 2018/0162368 | A1* | 6/2018 | Kim | B60K 6/36 |

FOREIGN PATENT DOCUMENTS

| | | |
|---|---|---|
| KR | 10-2016-0063621 A | 6/2016 |
| WO | WO 2016/116215 A1 | 7/2016 |

* cited by examiner

*Primary Examiner* — Bao Long T Nguyen
*Assistant Examiner* — Bakari Underwood
(74) *Attorney, Agent, or Firm* — Morgan, Lewis & Bockius LLP

(57) ABSTRACT

A cruise control method of a mild hybrid electric vehicle may include determining whether a cruise mode is operated according to an output signal of a user interface device by a controller; determining whether a vehicle speed increasing signal is output from the user interface device by the controller; determining a compensation torque depending on difference of a predetermined target speed and the current speed of the mild hybrid electric vehicle according to the vehicle speed increasing signal by the controller; and controlling the operation of the MHSG by the controller to output the determined compensation torque.

9 Claims, 2 Drawing Sheets

CRUISE CONTROL SYSTEM AND CRUISE CONTROL METHOD FOR MILD HYBRID ELECTRIC VEHICLE

CROSS-REFERENCE TO RELATED APPLICATION

The present application claims priority to Korean Patent Application No. 10-2017-0174548 filed on Dec. 18, 2017, the entire contents of which is incorporated herein for all purposes by this reference.

BACKGROUND OF THE INVENTION

Field of the Invention

The present invention relates to a cruise control system and a cruise control method for a mild hybrid electric vehicle.

Description of Related Art

As is generally known, a hybrid electric vehicle utilizes an internal combustion engine and a battery power source together. That is, the hybrid electric vehicle efficiently combines and utilizes power from the internal combustion engine and power of a motor.

The hybrid vehicle may be divided into a mild type and a hard type according to a power sharing ratio of the engine and the motor. The hybrid vehicle of the mild type (hereinafter, referred to as a mild hybrid vehicle) includes a mild hybrid starter & generator; MHSG) starting the engine instead of an alternator and generated by an output of the engine. The hybrid vehicle of the hard type separately includes a hard hybrid starter & generator starting the engine and generated by the output of the engine and a drive motor driving the vehicle.

The mild hybrid vehicle has not a running mode driving the vehicle by only using an MHSG's torque, but may assist an engine torque according to a running state by using the MHSG and may charge a battery (e.g., 48 V battery) through a regenerative braking. Accordingly, a fuel consumption of the mild hybrid vehicle may be improved.

A cruise control system that provides an auto cruise function for the convenience of the driver is provided in the vehicle. As the cruise control system allows the vehicle to be driven with a desired speed (a target speed) without an operation of an accelerator pedal and a brake pedal, it is possible to reduce a fatigue degree of the driver when traveling over a long distance.

However, while the auto cruise function is enabled, even if the driver operates the switch to increase/decrease the vehicle speed the immediate increasing/decreasing of the vehicle may not be done and a delay feeling may occur.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cruise control system and a cruise control method for a mild hybrid electric vehicle capable of realizing the immediate increasing/decreasing of the vehicle speed in the state that the auto cruise function of the mild hybrid electric vehicle is enabled.

A cruise control system for a mild hybrid electric vehicle according to an exemplary embodiment of the present invention may include a mild hybrid starter & generator (MHSG) starting an engine or generated by an output of the engine; a user interface device executing an interface with a user; a vehicle speed detecting device detecting a speed of the mild hybrid electric vehicle; and a controller configured for controlling an operation of the engine, setting a target speed during a cruise mode operation according to signals input from the user interface device, and determining a compensation torque of the MHSG based on the speed of the mild hybrid electric vehicle and the target speed to control the operation of the MHSG.

When the target speed is greater than the speed of the mild hybrid electric vehicle, the controller may be configured to control the output of the MHSG to output the compensation torque corresponding to a difference of the target speed and the speed of the mild hybrid electric vehicle.

The cruise control system for the mild hybrid electric vehicle according to an exemplary embodiment of the present invention may further include a battery electrically connected to the MHSG, the controller may be configured to control the operation of the engine according to the predetermined target speed when it is determined that the SOC may do not output the compensation torque.

When the speed of the mild hybrid electric vehicle is greater than the target speed, the controller may be configured to control the operation of the MHSG to output the regenerative braking torque corresponding to the difference of the speed of the mild hybrid electric vehicle and the target speed.

The cruise control system for the mild hybrid electric vehicle according to an exemplary embodiment of the present invention may further include a battery electrically connected to the MHSG, the controller may be configured to control the operation of the engine according to the predetermined target speed when it is determined that the SOC may do not execute the regenerative braking.

A cruise control method of a mild hybrid electric vehicle according to an exemplary embodiment of the present invention may include determining whether a cruise mode is operated according to an output signal of a user interface device by a controller; determining whether a vehicle speed increasing signal is output from the user interface device by the controller; determining a compensation torque depending on difference of a predetermined target speed and the current speed of the mild hybrid electric vehicle according to the vehicle speed increasing signal by the controller; and controlling the operation of the MHSG by the controller to output the determined compensation torque.

The cruise control method for the vehicle according to an exemplary embodiment of the present invention may further include detecting an SOC by the controller to determine whether it is possible for the MHSG to output the compensation torque.

The cruise control method for the vehicle according to an exemplary embodiment of the present invention may further include calculating a fuel amount corresponding to the determined compensation torque by the controller; and controlling the engine operation according to the calculated fuel amount by the controller.

The cruise control method for the vehicle according to an exemplary embodiment of the present invention may further include determining whether a vehicle speed decreasing signal is output from the user interface device by the controller; determining a regeneration torque depending on a difference of a predetermined target speed and the current speed of the mild hybrid electric vehicle by the controller according to the vehicle speed decreasing signal; and controlling the operation of the MHSG by the controller to output the determined regeneration torque.

The cruise control method for the vehicle according to an exemplary embodiment of the present invention may further include detecting an SOC by the controller to determine whether it is possible for the MHSG to output the regeneration torque.

The cruise control method for the vehicle according to an exemplary embodiment of the present invention further include calculating the fuel amount corresponding to the determined regeneration torque by the controller; and controlling the engine operation according to the calculated fuel amount by the controller.

A cruise control method for a mild hybrid electric vehicle according to an exemplary embodiment of the present invention may include determining whether a cruise mode is operated according to an output signal of a user interface device by a controller; determining whether a vehicle speed increasing signal is output from the user interface device by the controller; determining a compensation torque depending on a difference of a predetermined target speed and the current speed of the mild hybrid electric vehicle according to the vehicle speed increasing signal by the controller; determining whether a vehicle speed decreasing signal is output from the user interface device by the controller; determining a regeneration torque depending on a difference of a predetermined target speed the current speed of the mild hybrid electric vehicle by the controller according to the vehicle speed decreasing signal; and controlling the operation of the MHSG by the controller to the determined compensation torque or regeneration torque.

As above-described, according to an exemplary embodiment of the present invention, during the mild hybrid electric vehicle is driven with the cruise mode, the increasing/decreasing speed of the vehicle is executed through the MHSG (mild hybrid starter & generator), the, thereby eliminating the delay feeling.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
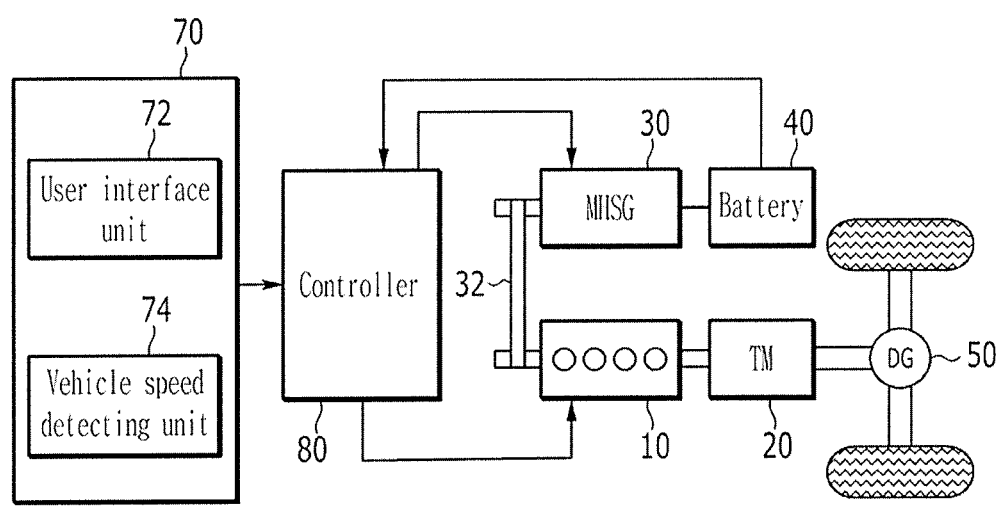
FIG. 1 is a block diagram of a hybrid electric vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

For the purpose of clear description of an exemplary embodiment of the present invention, parts which are not related to the description are omitted. The same reference numbers are used throughout the specification to refer to the same or like parts.

Furthermore, since each component shown in the drawings is arbitrarily illustrated for easy description, the present invention is not limited to the component illustrated in the drawings.

FIG. 1 is a block diagram of a mild hybrid electric vehicle according to an exemplary embodiment of the present invention.

As shown in FIG. 1, the mild hybrid electric vehicle according to an exemplary embodiment of the present invention includes an engine 10, a transmission 20, a mild hybrid starter & generator (MHSG) 30, a battery 40, a differential gear device 50, a wheel, a data detecting device 70, and a controller 80.

In the power delivery of the mild hybrid electric vehicle, the torque generated in the engine 10 is transmitted to the input shaft of the transmission 20, and the torque output from the output shaft of the transmission 20 is transmitted to the vehicle shaft via the differential gear device 50. The vehicle shaft rotates the wheel so that the mild hybrid electric vehicle runs by the torque generated in the engine 10.

The MHSG 30 starts the engine 10 or may be generated by the output of the engine 10. Also, the MHSG 30 may assist the torque of the engine 10. That is, the mild hybrid electric vehicle may use the torque of the MHSG 30 as an auxiliary power while using the torque of the engine 10 as a primary power. The engine 10 and the MHSG 30 may be connected through the belt 32.

The battery 40 may supply electricity to the MHSG 30 and may be charged by electricity recovered through the MHSG 30 in a regenerative braking mode. The battery 40 may be a 48 V battery. The mild hybrid electric vehicle further includes a LDC (low voltage DC-DC converter) converting the voltage supplied from the battery 40 into a low voltage and a 12 V battery supplying the low voltage to an electronic device load using the low voltage.

The data detecting device 70 detects a data for an auto cruise control and the data transmitted from the data detecting device 70 is transmitted to the controller 80. The data detecting device 70 may include a user interface device 72 and a vehicle speed detecting device 74.

The user interface device 72 performs an interface with a user (driver) and transmits signals input according to a user operation to the controller 80. The user interface device 72 may include a button, a key pad, a microphone, a touch screen, etc. For setting the cruise function of the mild hybrid electric vehicle.

The driver may set whether to use the cruise mode through the user interface device 72 and may set a target speed.

The vehicle speed detecting device 74 detects the speed of the mild hybrid electric vehicle and transmits the signal for the detected speed to the controller 80.

The controller 80 may be implemented in at least one processor operated with a predetermined program, and the predetermined program may include a series of commands to execute each step included in the cruise control method according to an exemplary embodiment of the present invention.

Figure 2:
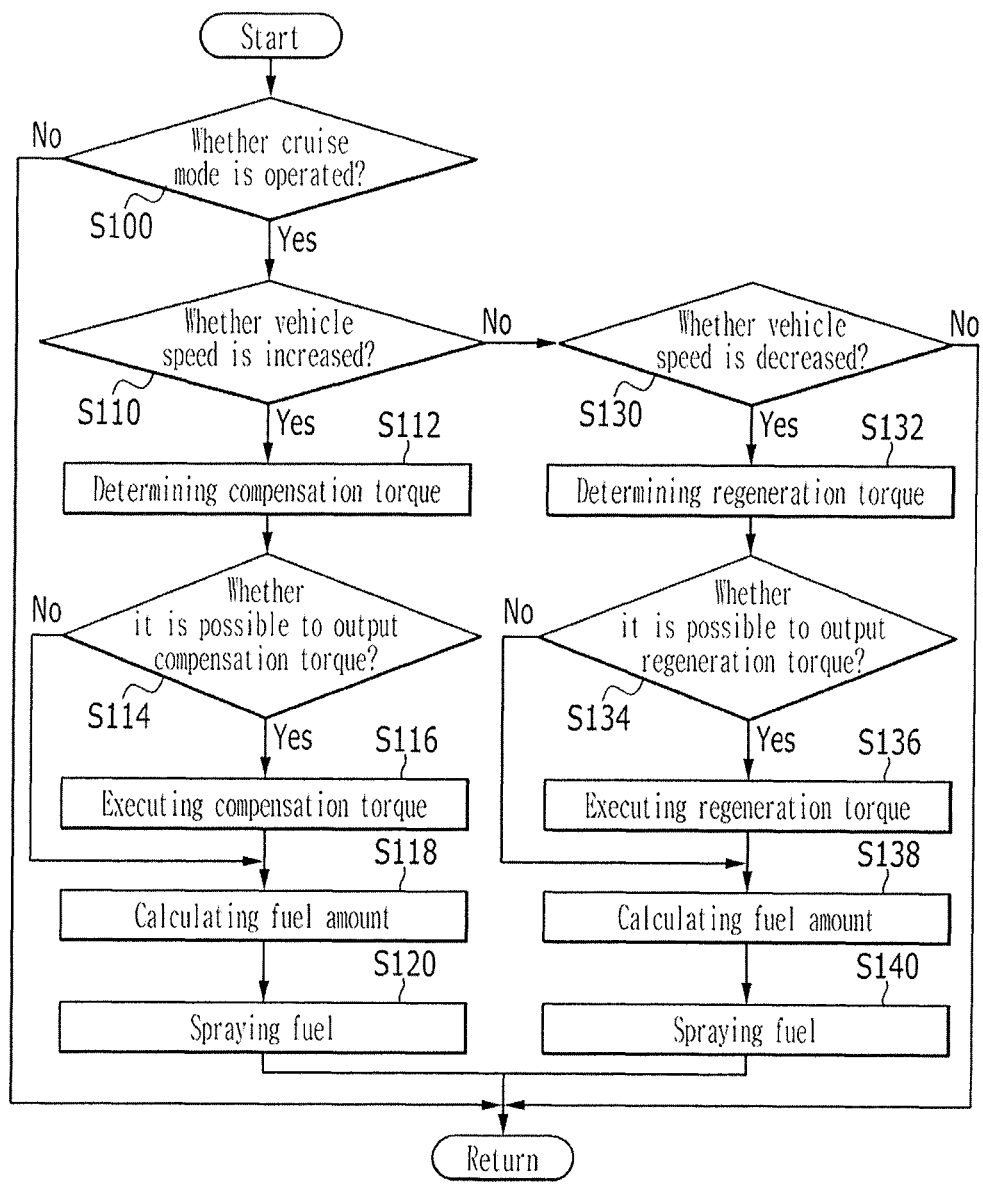
FIG. 2 is a flowchart of a cruise control method according to an exemplary embodiment of the present invention.

FIG. 2 is a flowchart of a cruise control method according to an exemplary embodiment of the present invention.

As shown in FIG. 2, the cruise control method according to an exemplary embodiment of the present invention starts by determining whether the cruise mode is operated (S100).

The controller 80 determines whether the cruise mode is set based on the signals input from the user interface device 72 (S100).

For example, it may be determined whether the cruise mode is predetermined through the input of the button, the keypad, the touch screen, and the like, which are mounted on a steering wheel, etc., and it may be determined whether the cruise mode is predetermined through an audio signal input to the microphone.

The controller 80 determines whether a vehicle speed increasing signal is output from the user interface device 72 (S110).

When the vehicle speed increasing signal is output, the controller 80 detects the current speed of the mild hybrid electric vehicle through the vehicle speed detecting device 74 and determines a compensation torque depending on a difference of a predetermined target speed and the current speed of the mild hybrid electric vehicle according to the vehicle speed increasing signal (S112).

Also, the controller 80 controls the operation of the MHSG 30 to output the determined compensation torque (S116).

According to the cruise control system and the cruise control method for the mild hybrid electric vehicle according to an exemplary embodiment of the present invention, if the vehicle speed increasing signal is generated in the state that the auto cruise function is enabled, the MHSG 30 outputs the compensation torque corresponding to the vehicle speed increasing such that the immediate speed increasing is possible.

The controller 80 determines whether the vehicle speed decreasing signal is output from the user interface device 72 (S130).

When the vehicle speed decreasing signal is output, the controller 80 detects the current speed of the mild hybrid electric vehicle through the vehicle speed detecting device 74 and determines the regeneration torque depending on the difference of the predetermined target speed and the current speed of the mild hybrid electric vehicle difference according to the vehicle speed decreasing signal (S132).

The controller 80 controls the operation of the MHSG 30 to output the regeneration torque (S136). That is, the MHSG 30 executes the regenerative braking such that the speed decreasing is done.

According to the cruise control system and the cruise control method for the mild hybrid electric vehicle according to an exemplary embodiment of the present invention, the vehicle speed decreasing signal is generated in the state the auto cruise function is enabled, the immediate speed decreasing is possible as the MHSG 30 outputs the regeneration torque corresponding to the vehicle speed decreasing, also the charging 80 to the battery 40 is done by the regenerative braking.

After the MHSG 30 outputs the compensation torque is, the controller 80 may calculate a fuel amount corresponding to the determined compensation torque (S118) and may control the engine operation by spraying the fuel according to the calculated fuel amount (S120).

That is, according to the cruise control system and the cruise control method of the mild hybrid electric vehicle according to an exemplary embodiment of the present invention, if the vehicle speed increasing signal is generated in the state that the auto cruise function is enabled, before the controller 80 firstly increases the vehicle speed by using the MHSG 30 before the output increasing of the engine 10 and then operates the engine 10, accordingly a resolution of the delay feeling is possible.

The controller 80 may calculate the fuel amount corresponding to the determined regeneration torque after the MHSG 30 outputs the regeneration torque (S138), the controller 80 may spray the fuel depending on the calculated fuel amount to control the engine operation (S140).

That is, according to the cruise control system and the cruise control method of the mild hybrid electric vehicle according to an exemplary embodiment of the present invention, if the vehicle speed decreasing signal is generated in the state that the auto cruise function is enabled, the controller 80 decreases the vehicle speed by executing the regenerative braking of the MHSG 30 before the output decreasing of the engine 10, and then operates the engine 10, the, thereby the resolution of the delay feeling is possible.

The controller 80 determines whether it is possible for the MHSG 30 to output the compensation torque output (S114) by detecting the charge state of the battery 40 before the step (S116).

For example, when the stage of the charge (SOC) of the battery 40 may not be discharged or is failed, the vehicle speed increasing through the MHSG 30 may not be possible. In the present case, the controller 80 may calculate the fuel amount corresponding to the determined compensation torque (S118) and may control the engine operation by spraying the fuel depending on the calculated fuel amount (S120).

The controller 80 determines whether it is possible for the MHSG 30 to output the regeneration torque (S134) by detecting the charge state of the battery 40 before the step (S136).

For example, when the stage of the charge (SOC) of the battery 40 may not be charged or is failed, the vehicle speed decreasing through the MHSG 30 may not be possible. In the present case, the controller 80 may calculate the fuel amount corresponding to the determined regeneration torque (S138) and may control the engine operation by spraying the fuel according to the calculated fuel amount (S140).

As above-described, according to an exemplary embodiment of the present invention, in the state that the auto cruise function of the mild hybrid electric vehicle is enabled, the MHSG 30 is operated such that the immediate increasing/decreasing of the vehicle speed may be done. Also, by charging the battery 40 through the regenerative braking of the MHSG 30, the fuel consumption of the mild hybrid electric vehicle may be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cruise control system for a mild hybrid electric vehicle, the cruise control system comprising:
    a controller;
    a mild hybrid starter & generator (MHSG) connected to the controller and starting an engine or generated by an output of the engine;
    a user interface device connected to the controller and executing an interface with a user; and
    a vehicle speed detecting device connected to the controller and detecting a speed of the mild hybrid electric vehicle,
    wherein the controller is configured for controlling an operation of the engine, setting a target speed during a cruise mode operation according to signals input from the user interface device, and determining a compensation torque of the MHSG based on the speed of the mild hybrid electric vehicle and the target speed to control an operation of the MHSG,
    wherein, when the speed of the mild hybrid electric vehicle is greater than the target speed determined according to the signals input from the user interface device executing the interface with the user, the controller is configured to control the operation of the MHSG to output a regenerative braking torque corresponding to a difference of the speed of the mild hybrid electric vehicle and the target speed and after controlling the operation of the MHSG, controlling of the operation of the engine by supplying an amount of fuel determined according to the regenerative braking torque, to the engine,
    wherein the controller is configured for realizing immediate decreasing of the speed of the mild hybrid electric vehicle while the MHSG outputs the regenerative braking torque in a state that an auto cruise function of the mild hybrid electric vehicle is enabled.

2. The cruise control system for the mild hybrid electric vehicle of claim 1, wherein:
    when the target speed is greater than the speed of the mild hybrid electric vehicle, the controller is configured to control an output of the MHSG to output the compensation torque corresponding to the difference of the target speed and the speed of the mild hybrid electric vehicle.

3. The cruise control system for the mild hybrid electric vehicle of claim 2, further including:
    a battery connected to the controller and electrically connected to the MHSG,
    wherein the controller is configured to control the operation of the engine according to the target speed when it is determined by the controller, based on a state of charge (SOC) of the battery, that the MHSG does not output the compensation torque.

4. The cruise control system for the mild hybrid electric vehicle of claim 3, further including:
    the battery connected to the controller and electrically connected to the MHSG,
    wherein the controller is configured to control the operation of the engine according to the target speed when it is determined by the controller, based on the SOC of the battery, that the MHSG does not execute a regenerative braking.

5. A cruise control method of a mild hybrid electric vehicle, the cruise control method comprising:
    determining, by a controller, whether a cruise mode is operated according to an output signal of a user interface device;
    determining, by the controller, whether a vehicle speed increasing signal is output from the user interface device;
    determining, by the controller, a compensation torque depending on a difference of a target speed and a current speed of the mild hybrid electric vehicle according to the vehicle speed increasing signal;
    controlling by the controller, an operation of a mild hybrid starter & generator (MHSG) to output a determined compensation torque;
    determining, by the controller, whether a vehicle speed decreasing signal is output from the user interface device;
    determining, by the controller, a regenerative braking torque depending on a difference of the target speed determined according to the vehicle speed decreasing signal received from the user interface device executing an interface with a user, and the current speed of the mild hybrid electric vehicle; and
    controlling, by the controller, the operation of the MHSG to output a determined regenerative braking torque and after controlling the operation of the MHSG to output the determined regenerative braking torque, controlling of an operation of an engine by supplying an amount of fuel determined according to the regenerative braking torque, to the engine,
    wherein the controller is configured for realizing immediate decreasing of a speed of the mild hybrid electric vehicle while the MHSG outputs the regenerative braking torque in a state that an auto cruise function of the mild hybrid electric vehicle is enabled.

6. The cruise control method for the vehicle of claim 5, further including:

detecting a state of charge (SOC) of a battery by the controller to determine, based on the SOC of the battery, whether it is possible for the MHSG to output the compensation torque.

7. The cruise control method for the vehicle of claim 5, further including:
    determining a fuel amount corresponding to a determined compensation torque by the controller when it is determined by the controller, based on the SOC, that the MHSG is possible to output the compensation torque; and
    controlling, by the controller, engine operation according to the determined fuel amount.

8. The cruise control method for the vehicle of claim 5, further including:
    detecting an SOC of a battery by the controller to determine based on the SOC of the battery whether it is possible for the MHSG to output the regenerative braking torque.

9. A cruise control method for a mild hybrid electric vehicle, the cruise control method comprising:
    determining, by a controller, whether a cruise mode is operated according to an output signal of a user interface device;
    determining, by the controller, whether a vehicle speed increasing signal is output from the user interface device;
    determining, by the controller, a compensation torque depending on a difference of a target speed and a current speed of the mild hybrid electric vehicle according to the vehicle speed increasing signal;
    determining, by the controller, whether a vehicle speed decreasing signal is output from the user interface device;
    determining, by the controller, a regenerative braking torque depending on the difference of the target speed determined according to the vehicle speed decreasing signal received from the user interface device executing an interface with a user, and the current speed of the mild hybrid electric vehicle; and
    controlling, by the controller, an operation of a mild hybrid starter & generator (MHSG) to output a determined compensation torque or a determined regenerative braking torque and after controlling the operation of the MHSG to output the determined regenerative braking torque, controlling of an operation of an engine by supplying an amount of fuel determined according to the regenerative braking torque, to the engine,
    wherein the controller is configured for realizing immediate increasing of a speed of the mild hybrid electric vehicle while the MHSG outputs the determined compensation torque in a state that an auto cruise function of the mild hybrid electric vehicle is enabled and for realizing immediate decreasing of the speed of the mild hybrid electric vehicle while the MHSG outputs the regenerative braking torque in the state that the auto cruise function of the mild hybrid electric vehicle is enabled.

* * * * *